United States Patent
Fraysse et al.

(10) Patent No.: US 9,630,722 B2
(45) Date of Patent: Apr. 25, 2017

(54) SUPPORT FOR ROUTING CONDUITS IN AN AIRCRAFT WING

(71) Applicant: AIRBUS OPERATIONS (SAS), Toulouse (FR)

(72) Inventors: Damien Fraysse, Toulouse (FR); Christophe Casse, Fenouillet (FR)

(73) Assignee: Airbus Operations (S.A.S.), Toulouse (FR)

( * ) Notice: Subject to any disclaimer, the term of this patent is extended or adjusted under 35 U.S.C. 154(b) by 847 days.

(21) Appl. No.: 13/895,731

(22) Filed: May 16, 2013

(65) Prior Publication Data

US 2013/0320149 A1 Dec. 5, 2013

(30) Foreign Application Priority Data

May 16, 2012 (FR) ...................................... 12 54509

(51) Int. Cl.
*B64D 37/00* (2006.01)
*F16L 5/12* (2006.01)
(Continued)

(52) U.S. Cl.
CPC ............... *B64D 37/00* (2013.01); *B64C 3/34* (2013.01); *B64D 37/005* (2013.01); *F16L 5/12* (2013.01);
(Continued)

(58) Field of Classification Search
CPC ... B64D 37/00; B64D 37/005; F16L 27/1021; F16L 27/103; F16L 27/113; F16L 27/1133; F16L 27/12

See application file for complete search history.

(56) References Cited

U.S. PATENT DOCUMENTS 6,736,354 B2   5/2004  Goto et al.
2010/0295293 A1*  11/2010  Healy .................... F16L 27/04
                                                            285/95

FOREIGN PATENT DOCUMENTS

DE    36 18 492    5/1987
EP    2 261 492    5/1987
(Continued)

OTHER PUBLICATIONS

Search Report for FR Application No. 1254509, dated Nov. 12, 2012, Fromentel, Henri, 2 pages.

*Primary Examiner* — Brian M O'Hara
(74) *Attorney, Agent, or Firm* — Nixon & Vanderhye P.C.

(57) ABSTRACT

A routing support (64) for a conduit line fastened in openings and the line includes a plurality of conduits connected end-to-end along a longitudinal axis. The routing support (64) incorporates an outer body (66) with a structure (68) for fastening the body in an opening. The routing support also includes a housing structure to accommodate the ends of two conduits in an end-to-end arrangement and the structure may include two separate structures (one for each conduit end (72)) or a single common structure (accommodating respective ends of the two conduits). The routing support also includes a flexible interface (74) connecting the housing structure (70) to the outer body (66). In addition, the flexible interface (74) and the outer body (66) and the housing structure (70) are integral. Embodiments include a line for transporting fuel with this routing support, and an aircraft wing in which such a line/support transports fuel.

14 Claims, 4 Drawing Sheets

(51) Int. Cl.
F16L 27/10 (2006.01)
F16L 27/113 (2006.01)
B64C 3/34 (2006.01)

(52) U.S. Cl.
CPC ......... *F16L 27/1021* (2013.01); *F16L 27/113* (2013.01)

(56) References Cited

FOREIGN PATENT DOCUMENTS

| EP | 1 081 409 | 3/2001 |
| GB | 1 156 882 | 7/1969 |
| GB | 1 398 880 | 6/1975 |
| WO | WO 00/75013 | 12/2000 |
| WO | WO 01/75349 | 10/2001 |

\* cited by examiner

SUPPORT FOR ROUTING CONDUITS IN AN AIRCRAFT WING

This application claims priority to French Patent Application No. 20120054509 filed May 16, 2012, the entire contents of which are hereby incorporated by reference.

BACKGROUND OF THE INVENTION

1. Field of the Invention

The present invention concerns a support used for coupling and routing conduits, notably for transporting fuel, in an aircraft wing.

2. Discussion of the Prior Art

As illustrated in FIG. 1, the prior art structure of an aircraft wing 10 generally incorporates a plurality of transverse ribs 12 distributed in the length L10 of the wing 10. In order to form a rigid structure, these transverse ribs 12 are principally connected by spars 14 extending in the length L10 of the wing 10, and secondarily by stringers 16 also arranged in the length L10 of the wing 10.

Since the transverse ribs 12 extend from the leading edge 18 to the trailing edge 20 of the wing 10 and from the lower surface 22 to the upper surface 24 of the wing 10, and since the spars 14 connect the lower surface 22 to the upper surface 24 of the wing 10, different chambers 26 are formed in the length L10 of the wing 10. In a known manner, these chambers 26 are used to house fuel tanks.

Therefore, in order to connect these fuel tanks situated in the chambers 26 of each wing 10 of the aircraft to the aircraft powerplant and/or the central tank of the aircraft, different lines 28 for transporting fuel are routed from one end to the other of each wing 10. As illustrated by the longitudinal section of a known wing 10 in FIG. 2, a line 28 for transporting fuel must pass through different transverse ribs 12 in order to connect the different tanks contained in the wing. In the same manner and with the same objective, certain lines 28 for transporting fuel can pass through a spar 14 of the wing 10.

According to the state of the art, a line 28 for transporting fuel is composed of floating conduits 30, at least one floating conduit 30 for each chamber 26 it passes through, and routing supports 32 are fastened in openings 34 made in the ribs 12 for the passage of the line 28 for transporting fuel. In parallel, the routing supports 32 also allow the end-to-end connection of the floating conduits 30 situated either side of each transverse rib and/or each spar 14.

The floating installation of the conduits 30 allows the bending of the wing 10 to be balanced out in order to preserve the sealing of the conduits for transportation of fuel, and the routing supports 32 help to avoid subjecting the line 28 to the forces connected with such bending.

In order to obtain this floating installation, a sliding link 36 is provided between each floating conduit 30 and each routing support 32. Each sliding link 36 authorizes an angular freedom LA and a translational play JT between the end 38 of the floating conduit 30 and the lateral part 40 of the routing support 32, whose connection it allows.

The sliding link 36 according to the state of the art takes the form of a sealing means 42, such as an O-ring seal, inserted in a groove 44 made around an end fitting 46 fitting the end 38 of the conduit 30, the end fitting 46 of the conduit 30 and the sealing means 42 being inserted in a bore 48 made in the lateral part 40 of the routing support 32.

According to a first disadvantage of this state of the art, since each sealing means 42 is not integral with the end fitting 46 and with the bore 48 which it connects, the sealing between each conduit 30 and each routing support 32 is not perfect and can be improved.

According to another disadvantage, in order to obtain the best possible sealing between each conduit 30 and each routing support 32, the groove 44 of each end fitting 46 and the bore 48 of each lateral part 40 must be machined with precision.

Such precision machining leads to a significant increase in the overall cost of fabricating each line 28 for transporting fuel.

SUMMARY OF THE INVENTION

To overcome the above disadvantages of the prior art, the present invention proposes a routing support for a line fastened in openings and composed of a plurality of conduits connected end-to-end along a longitudinal axis, the routing support incorporating an outer body with means of fastening in an opening, means of accommodating the extremities of two conduits placed end-to-end, and a flexible interface connecting these accommodating means to the outer body, the routing support being characterized in that the flexible interface is integral with the outer body and the accommodating means.

The invention also covers a line for transporting fuel installed in an aircraft wing with such routing supports.

BRIEF DESCRIPTION OF THE DRAWINGS

Other characteristics and advantages will emerge from the description that follows of the invention, which description is given only as an example, with reference to the annexed drawings, in which.

DETAILED DISCUSSION OF EMBODIMENTS

Figure 1:
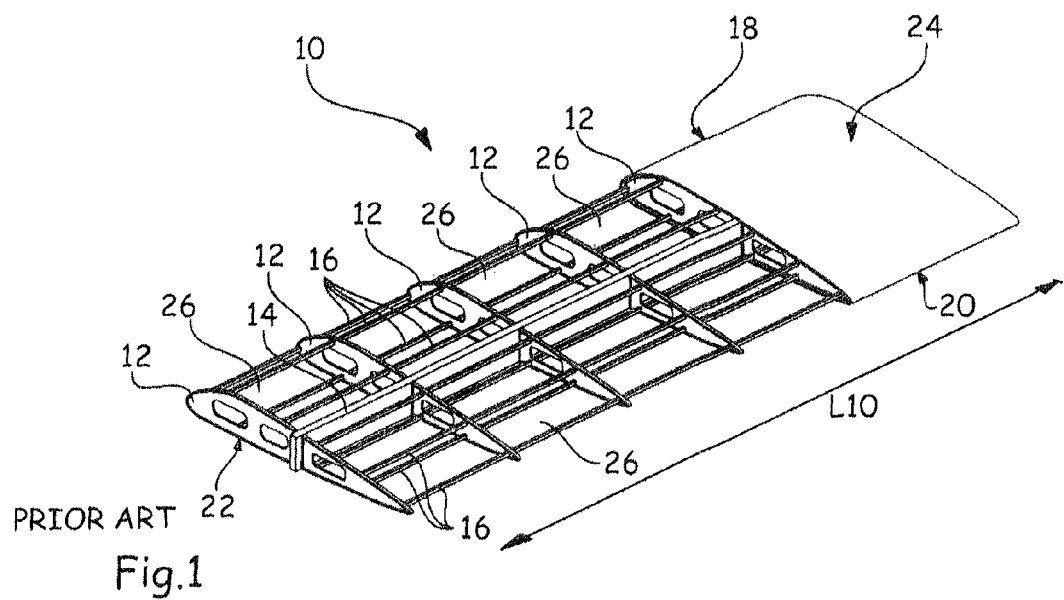
FIG. 1 represents a perspective view of the structure of an aircraft wing according to the prior art.
Figure 2:
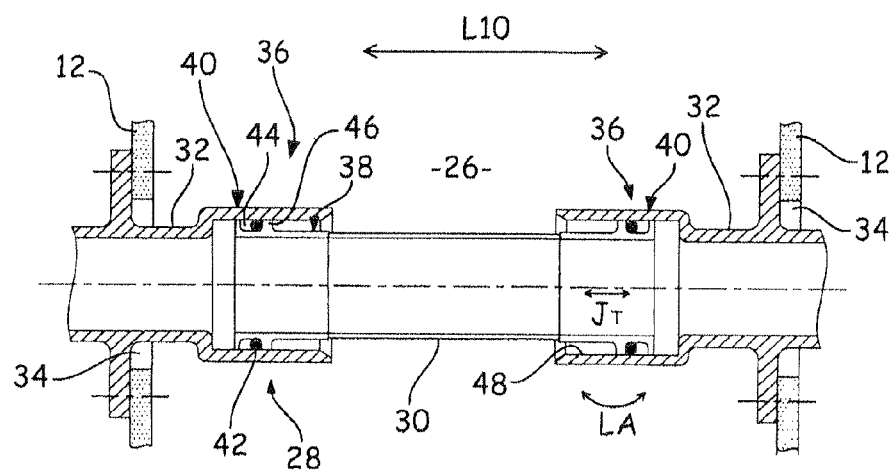
FIG. 2 represents a detail view in longitudinal section of a line for transporting fuel in an aircraft wing according to the prior art.
Figure 3:
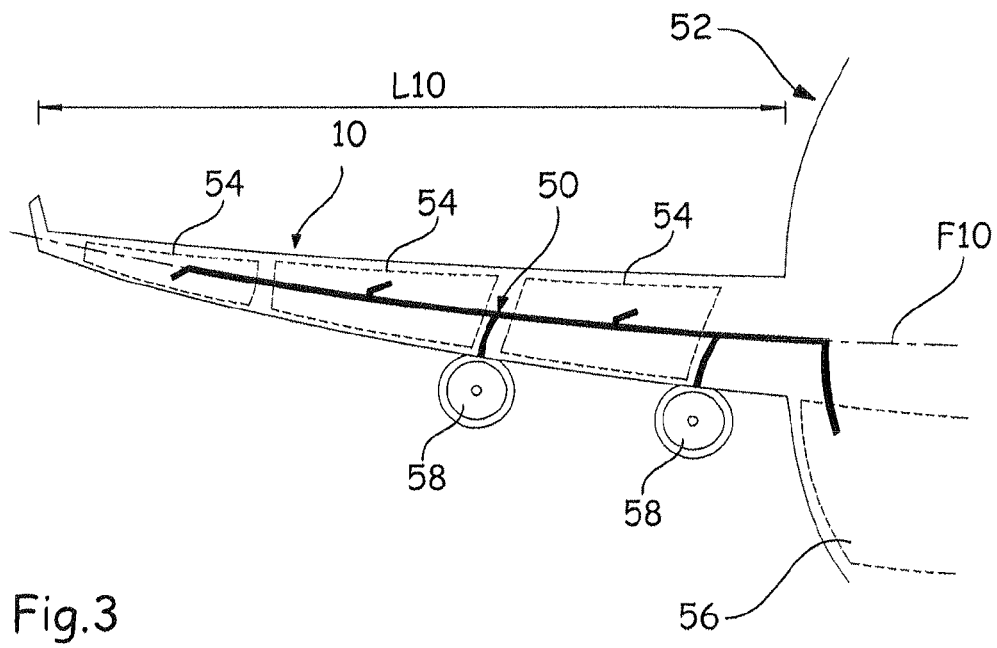
FIG. 3 represents a general and diagrammatic view in longitudinal section of a line for transporting fuel in an aircraft wing according to the invention.

As illustrated in FIG. 3, the present invention aims to allow the embodiment of a line 50 for transporting fuel in a wing 10 of an aircraft 52. As illustrated in FIG. 1, the structure of an aircraft wing 10 incorporates a plurality of transverse ribs 12 distributed in the length L10 of the wing, connected by spars 14 and stringers 16 extending in the length L10 of the wing 10.

Since the transverse ribs 12 extend from the leading edge 18 to the trailing edge 20 of the wing 10 and from the lower surface 22 to the upper surface 24 of the wing 10, and since the spars 14 connect the lower surface 22 to the upper surface 24 of the wing 10, different chambers 26 are formed in the length L10 of the wing 10 and are used to house different fuel tanks 54 as shown in FIG. 3.

Figure 4:
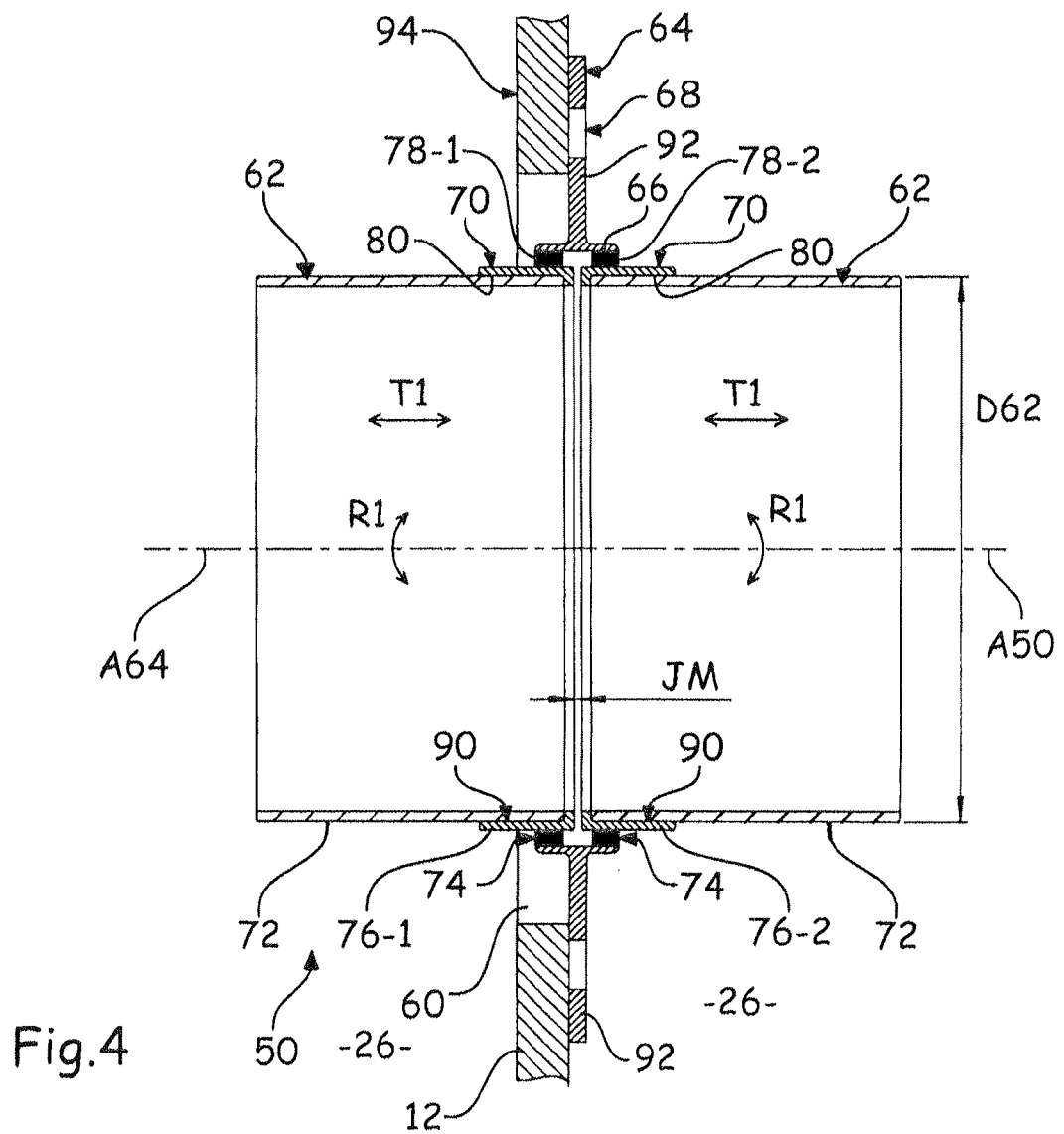
FIG. 4 represents a view in longitudinal section of a first embodiment of a routing support according to the invention.
Figure 5:
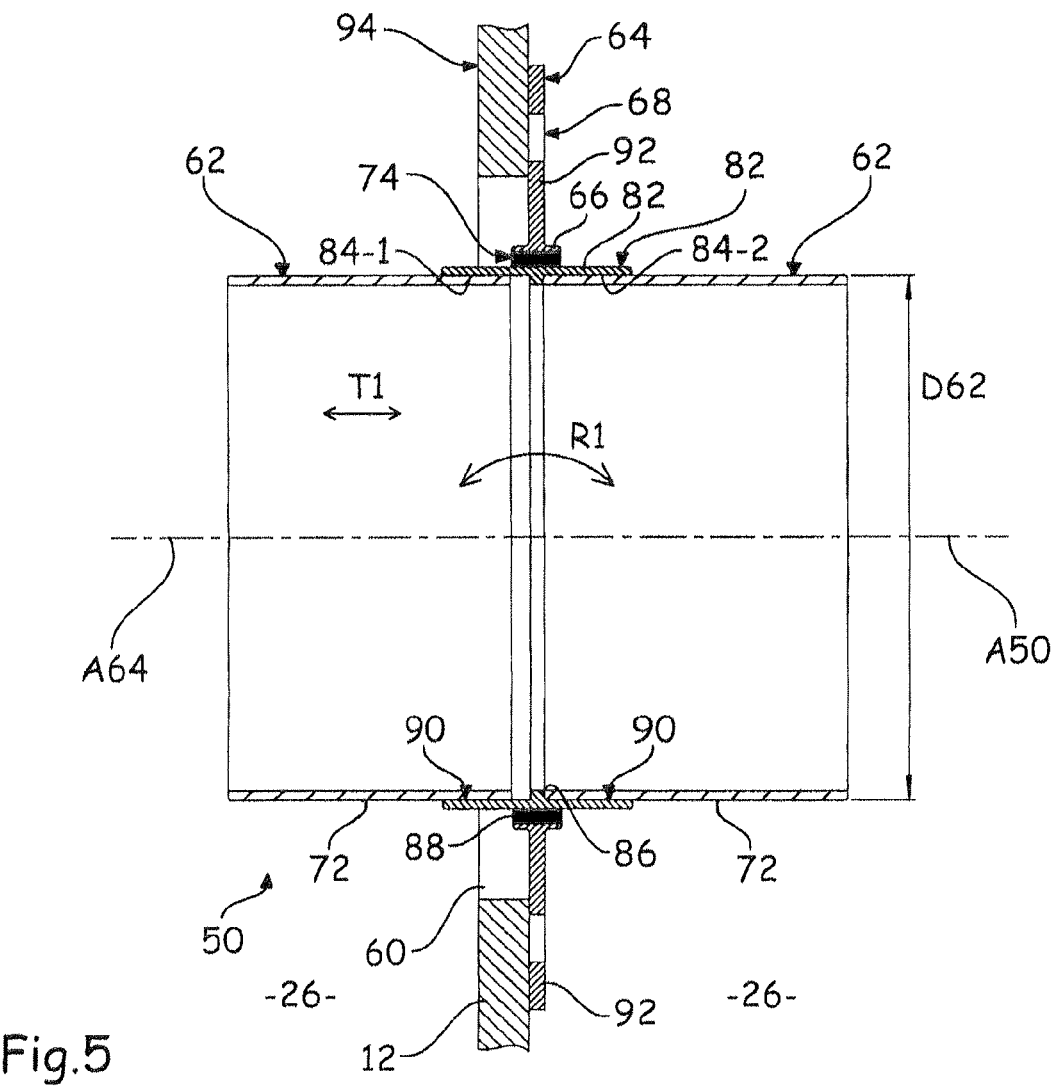
FIG. 5 represents a view in longitudinal section of a second embodiment of a routing support according to the invention.

Since the function of the line 50 for transporting fuel according to the invention is to connect fuel tanks 54 situated in the wing 10 of the aircraft 52 to a powerplant 58 of the aircraft and/or to a central tank 56 of the aircraft, this line 50 passes through different transverse ribs 12 through openings 60 made for this purpose through these ribs 12, as illustrated by the longitudinal sections of the line 50 shown in FIGS. 4 and 5. The line 50 for transporting fuel may also pass through certain spars 14 of the wing 10.

The line 50 for transporting fuel according to the invention is comprised of a plurality of conduits 62 connected end-to-end along a longitudinal axis A50. This line 50 is fastened in the openings 60 made in the transverse ribs 12 and/or in the spars 14 that the line passes through. According to a preferred arrangement, at least one conduit 62 is provided for in each chamber 26 the line passes through.

The invention therefore provides a routing support 64 allowing the end-to-end connection of the conduits 62 situated on either side of each transverse rib 12 and/or each spar 14 the line passes through, and allowing the transporting line 50 to be fastened to each transverse rib 12 and/or each spar 14 it passes through.

Figure 6:
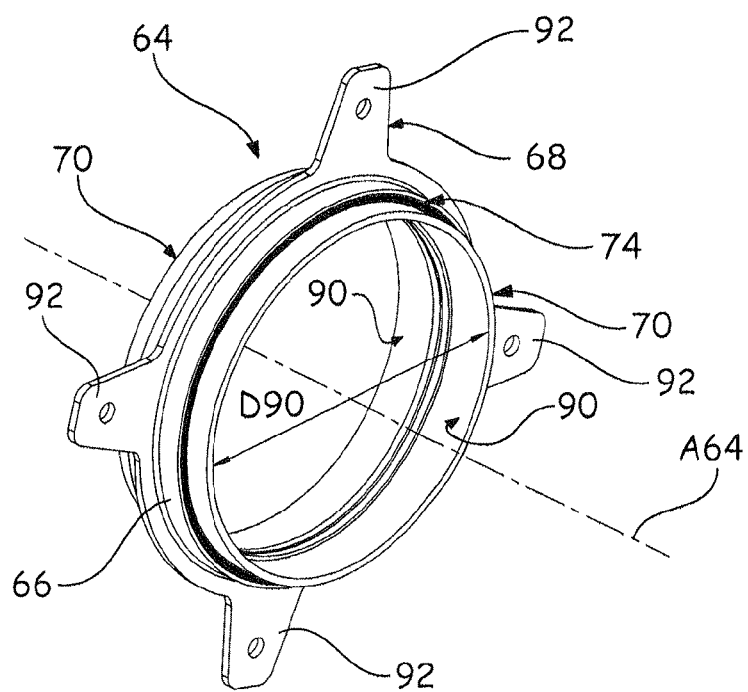
FIG. 6 represents a perspective view of the routing support of FIG. 4.

According to the invention, and as illustrated in FIGS. 4 to 6, the routing support 64 incorporates an outer body 66 with means 68 for fastening in an opening 60, means 70 for accommodating the ends 72 of two conduits 62 placed end-to-end, and a flexible interface 74 connecting these accommodating means 70 to the outer body 66.

In order to prevent any friction in the connection created between the conduits 62 placed end-to-end, the flexible interface 74 is integral with the outer body 66 and the accommodating means 70. This integrality of the flexible interface 74 with the outer body 66 and the accommodating means 70 allows the sealing of the connection made between the two conduits 62 placed end-to-end.

According to the invention, the flexible interface 74 is integral with the outer body 66 and the accommodating means 70 because it is fabricated by the same process and the same means as the outer body 66 and the accommodating means 70. To that effect, the flexible interface 74, the outer body 66 and the accommodating means 70 are obtained by bi-material injection, simultaneous or sequential, with the flexible interface 74 being made of a different material from the material of the outer body 66 and the accommodating means 70.

Due to the supporting function of the outer body 66 and the accommodating function of means 70, the outer body 66 and the accommodating means 70 are made of a material conferring upon them an appropriate rigidity for firmly fastening the routing support 64 in the opening 60 and for firmly holding the conduits 62 connected end-to-end.

As for the flexible interface 74, it is made of a material conferring upon it a bending capability appropriate for authorizing movements of the accommodating means 70 in relation to the outer body 66. This bending capability prevents, or at least limits, of any transmission of force between the line 50 and the transverse rib 12 (or a spar 14) when the wing 10, in which the line 50 is installed, bends.

In an embodiment of the invention, the outer body 66 and the accommodating means 70 are made of a fibre-reinforced thermoplastic material, while the flexible interface 74 is made of elastomer. The thermoplastic material used is preferably polyetherimide, chosen for its flame retardant properties, its resistance to high temperatures of approximately 180° Celsius or more, its electrical insulating properties and its high Young's modulus in the region of 3000 MPa.

On the other hand, the flexible interface 74 is made of rubber, this material offering a Young's modulus situated between 1 and 100 MPa. Thanks to the elasticity of its material, the flexible interface 74 permits at least a slight translation T1 and/or a slight rotation R1 of the accommodating means 70, and hence of the ends 72 of the conduits 62, in relation to the outer body 66, with other freedoms of movement of the accommodating means 70 also existing on a smaller scale due to this elasticity of the material.

In a first embodiment illustrated in FIG. 4, the accommodating means 70 may take the form of two accommodating parts (76-1, 76-2), mounted back-to-back, with each accommodating part (76-1, 76-2) incorporating a housing 80 for accommodating the end 72 of a conduit 62.

In order to separate the movements of translation T1 and rotation R1 of each accommodating part (76-1, 76-2), and hence of each of the two ends 72 of the accommodated conduits 62, the flexible interface 74 is divided into two flexible parts (78-1, 78-2) which are both distinct and distant. The parts comprise a first flexible part 78-1 connecting a first accommodating part 76-1 to the outer body 66 and a second flexible part 78-2 connecting a second accommodating part 76-2 to the outer body 66.

An installation clearance JM is provided between the accommodating parts (76-1, 76-2) when fabricating the routing support 64. This installation clearance JM allows each accommodating part (76-1, 76-2) to move in rotation R1 or in translation T1 independently of the other accommodating part as shown in the drawing.

In a second embodiment illustrated in FIG. 5, the accommodating means 70 take the form of a single accommodating part 82 incorporating two housings (84-1, 84-2) for accommodating the ends 72 of the conduits 62, where the two accommodating housings (84-1, 84-2) are mounted back-to-back. In order to differentiate between the two accommodating housings (84-1, 84-2), the accommodating part 82 incorporates a stop 86 separating the two accommodating housings (84-1, 84-2). The stop 86 advantageously also serves as a reference for positioning the extremities 72 of the conduits 62, which can be supported against this stop.

In this second embodiment, the flexible interface 74 takes the form of a single flexible part 88 connecting the accommodating part 82 to the outer body 66. Consequently, in this second embodiment, the two accommodating housings (84-1, 84-2) and hence the two ends 72 of the accommodated conduits 62 are integral in their movements, notably of translation T1 and rotation R1, in relation to the outer body 66.

Since a line 50 for transporting fuel is generally composed of cylindrical conduits 62 arranged end-to-end along the longitudinal axis A50 of this line 50, the routing support 64 incorporates an outer body 66, accommodating means 70 and a flexible interface 74, all cylindrical around a central axis A64.

In the different embodiments, the accommodating housings (80, 84-1, 84-2) therefore take the form of bores 90 made along this central axis A64. In each accommodating part (76-1, 76-2, 82), these bores 90 have an inside diameter D90 corresponding, except for the installation clearance, to the outside diameter D62 of the conduits 62.

As illustrated by the perspective view in FIG. 6, the means 68 for fastening the line in an opening 60 (made in a transverse rib 12 or in a spar 14) takes the form of fastening lugs 92 intended to be fastened by any appropriate means, such as bolts or rivets, to the edge 94 of the opening 60 in which the routing support 64 is located.

When embodying a line 50 for transporting fuel in an aircraft wing 10 using routing supports 64 of either embodiment, there is provision for bonding each end 72 of the conduits 62 forming the line 50 into the accommodating means 70 of the routing support 64. More precisely, the ends 72 of the conduits 62 are bonded into the accommodating housings (80, 84-1, 84-2) of the accommodating parts (76-1, 76-2, 82).

This bonding is preferably achieved with a resin compatible with the transported fuel and meeting the temperature and pressure constraints of the operating environment, such as epoxy resin. Furthermore, this bonding guarantees the sealing of the connection created between two conduits 62 by each routing support 64.

Thanks to the movements permitted by the flexible interface 74 of each routing support 64 at each transverse rib 12 (or spar 14) it passes through, it is possible to embody a rigid line 50 composed of conduits 62 made of a rigid material. The invention preferably makes provision to embody the line 50 with rigid conduits 62 made of composite material, and more particularly of polymer reinforced with carbon fibres.

In order to avoid subjecting the line 50 and its conduits 62 to tensile or compression stress and only to load them in pure bending when the wing 10 bends, the invention makes provision to arrange this line 50 along the neutral axis F10 of the wing, the longitudinal axis A50 of the line being superposed on the neutral axis F10 of the wing.

Thanks to this mounting along the neutral axis F10 of the wing combined with the use of routing supports 64 according to the invention, even if rigid conduits 62 are used, the forces transmitted between the line 50 and the ribs 12 (or the spars 14) are virtually nil and the sealing of the line is preserved.

The invention has been described for an application for transporting fuel in an aircraft wing. Nevertheless, the routing support 64 according to the invention can perfectly well be used to fabricate lines transporting other fluids in other parts of an aircraft. The invention also covers an aircraft wing 10 in which at least one line 50 circulates for transporting fuel, embodied with routing supports 64 according to the invention.

The invention claimed is:

1. A routing support for a line fastened in an opening in a structural component of an aircraft, the line comprised of two conduits connected end-to-end along a longitudinal axis, the routing support comprising:
    an outer body cooperating with a fastener configured to fasten the outer body in the aircraft structural component opening;
    a housing structure comprised of two accommodating parts for accommodating respective ends of the two conduits placed end-to-end; and
    a flexible interface resiliently connecting the housing structure to the outer body, wherein the flexible interface is integral and a single piece with the outer body and the housing structure, the flexible interface being attached to the two accommodating parts so as to physically distance them from the outer body and being comprised of a material having a bending capability so as to permit by bending limited translation and limited rotation of each of the two accommodating parts, and thus each of the two respective conduits with respect to the outer body,
    wherein the outer body and the housing structure are created by simultaneous or sequential bi-material injection with the flexible interface, and
    wherein the flexible interface is a different material from the material of the outer body and the housing structure.

2. The routing support according to claim 1, wherein the outer body and the housing structure are comprised of a material having a rigidity sufficient to firmly fasten the routing support in the opening and for firmly holding the ends of said conduits in an end-to-end arrangement, while the flexible interface is formed of a flexible material configured to permit movement of the housing structure in relation to the outer body.

3. The routing support according to claim 2, wherein the outer body and the housing structure are comprised of a fiber-reinforced thermoplastic material and the flexible interface comprise an elastomer.

4. The routing support according to claim 1, wherein the housing structure comprises the two accommodating parts, mounted back-to-back, with each accommodating part incorporating a housing for accommodating the end of a conduit.

5. The routing support according to claim 4, in which the flexible interface has two flexible parts, distinct and distant, wherein each flexible part connecting only one of said two accommodating parts to the outer body, and providing an installation clearance between said two accommodating parts.

6. The routing support according to claim 4, wherein the housing structure includes a stop separating the two accommodating parts.

7. An aircraft fuel line for transporting fuel in an aircraft wing, said line comprised of:
    a plurality of conduits connected end-to-end along a longitudinal axis, at least one routing support, the routing support comprising:
    an outer body cooperating with a fastener configured to fasten the outer body in the aircraft structural component opening;
    a housing structure comprised of two accommodating parts for accommodating respective ends of the two conduits placed end-to-end; and
    a flexible interface resiliently connecting the housing structure to the outer body, wherein the flexible interface is integral and a single piece with the outer body and the housing structure, the flexible interface being attached to the two accommodating parts so as to physically distance them from the outer body and being comprised of a material having a bending capability so as to permit by bending limited translation and limited rotation of each of the two accommodating parts, and thus each of the two respective conduits with respect to the outer body,
    wherein the outer body and the housing structure are created by simultaneous or sequential bi-material injection with the flexible interface,
    wherein the flexible interface is a different material from the material of the outer body and the housing structure and,
    wherein said end-to-end connected conduit ends are bonded into the housing structure of the routing support that supports the line.

8. An aircraft wing having at least one aircraft fuel line for transporting fuel in the aircraft wing, the line being comprised of:
    a plurality of conduits connected end-to-end along a longitudinal axis, and
    at least one routing support for fastening the line in an opening, the line fastened in the opening being comprised of two conduits placed end-to-end along the longitudinal axis, the routing support comprising:
an outer body cooperating with a fastener configured to fasten the outer body in the opening:
a housing structure comprised of two accommodating parts for accommodating respective ends of the two conduits placed end-to-end; and
a flexible interface resiliently connecting the housing structure to the outer body, wherein the flexible interface is integral and a single piece with the outer body and the housing structure, the flexible interface being attached to the two accommodating parts so as to physically distance them from the outer body and being comprised of a material having a bending capability so as to permit by bending limited translation and limited rotation of each of the two accommodating parts, and thus each of the two respective conduits with respect to the outer body,
wherein the outer body and the housing structure are created by simultaneous or sequential bi-material injection with the flexible interface, and
wherein the flexible interface is a different material from the material of the outer body and the housing structure,
wherein respective ends of the two end-to-end placed conduits are bonded into the housing structure of the routing support, and
wherein the wing has a neutral bending axis in which the length of the fuel line along the neutral bending axis does not vary during flexing of the wing.

9. A routing support for a line fastened in an opening in a structural component of an aircraft, the line being comprised of at least two conduits connected end-to-end along a longitudinal axis, the routing support comprising:
an outer body configured for being mounted in the aircraft structural component opening;
two housings, each housing configured to encompass a corresponding end of one of the at least two conduits, the housings being in an end-to-end arrangement; and
a flexible interface resiliently connecting each of the two housings to the outer body, wherein the flexible interface is integral and a single piece with the outer body and the two housings, and the flexible interface being attached to the two housings so as to physically distance them from the outer body and being comprised of a material having a bending capability so as to permit by bending limited translation and limited rotation of each of the two housings, and thus each of the two conduits with respect to the outer body,
wherein the outer body and the housing structure are created by simultaneous or sequential bi-material injection with the flexible interface, and
wherein the flexible interface is a different material from the material of the outer body and the housing structure.

10. The routing support according to claim 9, wherein the outer body and the two housings are comprised of a relatively rigid material configured to firmly fasten the routing support in the opening and for firmly holding the ends of said conduits in an end-to-end arrangement, while the flexible interface is a relatively flexible material which permits the translation and rotation of the housings in relation to the outer body.

11. The routing support according to claim 10, wherein the outer body and the two housings are comprised of a fibre-reinforced thermoplastic material and the flexible interface is made of elastomer.

12. A routing support for a line fastened in an opening, said line comprised of at least two conduits connected end-to-end along a longitudinal axis, the routing support comprising:
an outer body configured for mounting in said opening;
a single housing structure configured to encompass ends of said at least two conduits in an end-to-end arrangement; and
a flexible interface resiliently connecting the housing structure to the outer body, wherein the flexible interface is integral and a single piece with the outer body and the housing structure, the flexible interface being attached to the single housing structure so as to physically distance the single housing structure from the outer body and being comprised of a material having a bending capability so as to permit by bending, a limited translation and rotation of said single housing structure, and thus each of the two conduits with respect to said outer body,
wherein the outer body and the housing structure are created by simultaneous or sequential bi-material injection with the flexible interface, and
wherein the flexible interface is a different material from the material of the outer body and the housing structure.

13. The routing support according to claim 12, wherein the outer body and the single housing structure are comprised of a material having a rigidity sufficient to firmly fasten the routing support in the opening and for firmly holding the ends of said conduits in an end-to-end arrangement, while the flexible interface is a relatively flexible material permitting movement of the housing structure in relation to the outer body.

14. The routing support according to claim 13, wherein the outer body and the housing structure are comprised of a fiber-reinforced thermoplastic material and the flexible interface is made of elastomer.

* * * * *